United States Patent
Choudhury et al.

(10) Patent No.: US 9,378,223 B2
(45) Date of Patent: Jun. 28, 2016

(54) STATE DRIVEN MOBILE SEARCH

(75) Inventors: Sayeed Z. Choudhury, New York, NY (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 12/687,068

(22) Filed: Jan. 13, 2010

(65) Prior Publication Data

US 2011/0173229 A1    Jul. 14, 2011

(51) Int. Cl.
*G06F 17/30* (2006.01)
*G01C 21/36* (2006.01)

(52) U.S. Cl.
CPC ...... *G06F 17/30241* (2013.01); *G01C 21/3682* (2013.01); *G06F 17/3087* (2013.01)

(58) Field of Classification Search
CPC .............. G06F 17/30241; G06F 17/30424; G06F 17/30693
USPC ............. 707/713, 769–770; 455/456.1–456.6
See application file for complete search history.

(56) References Cited

U.S. PATENT DOCUMENTS

| | | | |
|---|---|---|---|
| 6,553,310 B1 | 4/2003 | Lopke | |
| 6,711,474 B1* | 3/2004 | Treyz et al. | 701/1 |
| 6,716,101 B1 | 4/2004 | Meadows et al. | |
| 6,879,285 B2* | 4/2005 | Nobukiyo | 342/357.31 |
| 6,957,393 B2 | 10/2005 | Fano et al. | |
| 7,457,628 B2 | 11/2008 | Blumberg et al. | |
| 7,469,827 B2 | 12/2008 | Katragadda et al. | |
| 2002/0111172 A1 | 8/2002 | DeWolf et al. | |
| 2003/0040324 A1 | 2/2003 | Eldering et al. | |
| 2005/0192025 A1 | 9/2005 | Kaplan | |
| 2005/0202833 A1 | 9/2005 | Motobayashi | |
| 2007/0149210 A1 | 6/2007 | McKiou et al. | |
| 2007/0162942 A1* | 7/2007 | Hamynen et al. | 725/105 |
| 2007/0232326 A1 | 10/2007 | Johnson | |
| 2008/0076451 A1 | 3/2008 | Sheha et al. | |
| 2008/0090591 A1 | 4/2008 | Miller et al. | |
| 2008/0214157 A1 | 9/2008 | Ramer et al. | |
| 2008/0242317 A1 | 10/2008 | Abhyanker | |
| 2008/0248815 A1 | 10/2008 | Busch | |
| 2008/0249983 A1* | 10/2008 | Meisels et al. | 707/3 |
| 2008/0268876 A1 | 10/2008 | Gelfand et al. | |
| 2009/0005972 A1* | 1/2009 | de Koning | 701/208 |
| 2009/0029687 A1 | 1/2009 | Ramer et al. | |

(Continued)

FOREIGN PATENT DOCUMENTS

CN        1536514 A      10/2004
CN      101398303 A       4/2009

(Continued)

OTHER PUBLICATIONS

Wireless News, "Ask.com Mobile Launches Speech-Activated Directions," M2 Communications Ltd, www.10meters.com, Jan. 10, 2008.

(Continued)

*Primary Examiner* — Monica Pyo
(74) *Attorney, Agent, or Firm* — Thomas A. Jolly (57) ABSTRACT

Methods, apparatuses, and systems are provided to process search queries initiated at a mobile computing device based, at least in part, on a state of the mobile computing device as indicated by one or more of travel speed, travel direction, and geographic location of the mobile computing device.

26 Claims, 7 Drawing Sheets

(56) References Cited

U.S. PATENT DOCUMENTS

| | | | |
|---|---|---|---|
| 2009/0054077 A1 | 2/2009 | Gauthier et al. | |
| 2009/0082024 A1 | 3/2009 | Elliott | |

FOREIGN PATENT DOCUMENTS

| | | |
|---|---|---|
| EP | 1296303 | 3/2003 |
| EP | 1441198 A2 | 7/2004 |
| JP | H1151666 A | 2/1999 |
| JP | 2000187667 A | 7/2000 |
| JP | 2000205879 A | 7/2000 |
| JP | 2002163267 A | 6/2002 |
| JP | 2003283664 | 10/2003 |
| JP | 2009087043 A | 4/2009 |
| WO | 2005062066 | 7/2005 |
| WO | 2007080473 | 7/2007 |
| WO | 2007117368 | 10/2007 |
| WO | 2008003089 | 1/2008 |
| WO | 2008124074 | 10/2008 |

OTHER PUBLICATIONS

Anonymous, "Garmin International Inc.; Garmin nuvifone Takes Personal Navigation and Communication to the Next Level," Asia Business Newsweekly, Atlanta, Feb. 4, 2008, p. 46.

"GPShopper—all on select Sprint phones. (Emerging Technologies & Markets)," Wireless Design & Development, 15.7, p. 8(1), Advantage Business Media, Jul. 2007.

Hile et al., "Information overlay for camera phones in indoor environments," Lecture Notes in Computer Science, vol. 4718 LNCS, Location and Context Awareness—Third international Symposium, Oberpfaffenhofen, Germany, Springer Verlag, 2007, p. 68-84.

"InfoSpace offering free trial of location service.," RCR Wireless News, 25.49, Crain Communications, Inc., Dec. 4, 2006, p. 27.

"Sprint and InfoSpace Introduce First Comprehensive Location Based Search Product for Mobile Phones: Breakthrough Application Will Help On-The-Go Consumers Easily Access Relevant Location Based Information," Business Week, Business Wire, Mar. 27, 2006.

"Vicinity Launches Location-Based Marketing Services to Canada," Directions Magazine, Directions Media, www.directionsmag.com/press.releases/?duty=Show&id=3152, Apr. 18, 2001.

Reedy, "VZW, AT&T prep for ubiquitous mobile location.(national services planning).," Telephony (Online Exclusive), Penton Business Media, Inc., Apr. 24, 2009.

International Search Report and Written Opinion—PCT/US2011/021184, International Search Authority—European Patent Office—Apr. 1, 2011.

Rainer Simon, et al., "Beyond Location Based—The Spatially Aware Mobile Phone", Jan. 1, 2006, Web and Wireless Geographical Information Systems Lecture Notes in Computer Science; LNCS, Springer, Berlin, DE, pp. 12-21, XP019051522, ISBN: 978-3-540-49466-9.

Taiwan Search Report—TW100101278—TIPO—Mar. 4, 2013.

* cited by examiner

STATE DRIVEN MOBILE SEARCH

BACKGROUND

1. Field

The subject matter disclosed herein relates to electronic devices, and more particularly to methods, apparatuses, and systems for use in and/or with mobile searching of electronic information.

2. Information

Wireless communication systems are fast becoming prevalent technologies in the digital information arena. Satellite and cellular telephone services and other like wireless communication networks already span the globe. Additionally, new wireless systems (e.g., networks) of various types and sizes are added each day to provide connectivity among a plethora of computing platforms, both fixed and mobile. Many of these wireless systems are coupled together through other communication systems and resources to promote even more communication and sharing of information.

One popular and increasingly important wireless technology includes navigation systems and in particular those that are enabled for use with a satellite positioning system (SPS) that includes, for example, the global positioning system (GPS) and/or other like Global Navigation Satellite Systems (GNSSs). SPS enabled devices, for example, may receive wireless SPS signals that are transmitted by transmitters affixed to one or more orbiting satellites to determine geographic location of the device. Similarly, some devices may receive wireless signals from terrestrial based navigation systems to determine geographic location.

Furthermore, information in the form of electronic data continues to be generated or otherwise identified, collected, stored, shared, and analyzed. Databases and other like data repositories are common place, as are related communication networks and computing resources that provide access to such information. As one example, the World Wide Web provided by the Internet continues to grow with seemingly continual addition of new information.

To provide access to such information, tools and services have been provided which allow for copious amounts of information to be searched through. For example, service providers may allow for users to search the World Wide Web or other like networks using search engines. Similar tools or services may allow for one or more databases or other like data repositories to be searched. However, with so much information being available, there is a continuing need for relevant information to be identified and presented in an efficient manner

SUMMARY

Implementations relating to mobile searching of electronic information are provided. In one implementation, a method is provided that comprises obtaining a search query initiated at a mobile computing device ("mobile device") in which the search query comprises one or more search terms. The method further comprises obtaining an inertial state of the mobile device indicated by one or more inertial sensor measurements obtained at the mobile device. The method further comprises processing the search query to obtain one or more search results responsive to the one or more search terms in which the one or more search results are limited to a geographic scope that is based, at least in part, on the inertial state indicated by the one or more inertial sensor measurements. It should be understood, however, that this is merely an example implementation, and that claimed subject matter is not limited to this particular implementation.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Mobile searching of electronic information is disclosed in which a state of a mobile device (e.g., as indicated by travel speed, travel direction, and/or geographic location) is used to identify search results responsive to search queries initiated at the mobile device. By processing search queries based on the state of the mobile device, more relevant search results may be provided to the mobile device user. As one example, search results that are appropriate to the travel capability and/or mobility of the mobile device user (e.g., as indicated by the travel speed of the mobile device) may be identified. For example, mobile device users moving at a higher travel speed, such as by automobile, train, bicycle, etc. may be provided with different search results than mobile devices users moving at a lower travel speed, such as when walking. As another example, travel direction of the mobile device may be used to orientate geographic search regions from which search results may be identified so that geographic points of interest may be presented to the mobile device user that reside along the travel route in the direction of travel of the mobile device. Search results may be periodically or continuously updated (e.g., in real-time) responsive to a state change of the mobile device, including changes to travel speed, travel direction, and/or geographic location of the mobile device.

To obtain such state information for the mobile device, inertial sensor measurements obtained at the mobile device may used in conjunction with navigation information obtained by either SPS or terrestrial based navigation systems to acquire travel speed, travel direction, and/or geographic location of the mobile device. Such inertial sensor measurements may provide more accurate and/or more rapid acquisition of state information than if SPS or terrestrial based navigation systems were alone used. In this way, the relevancy of search results may be improved for mobile device users as a result of improved acquisition of state information.

Figure 1:
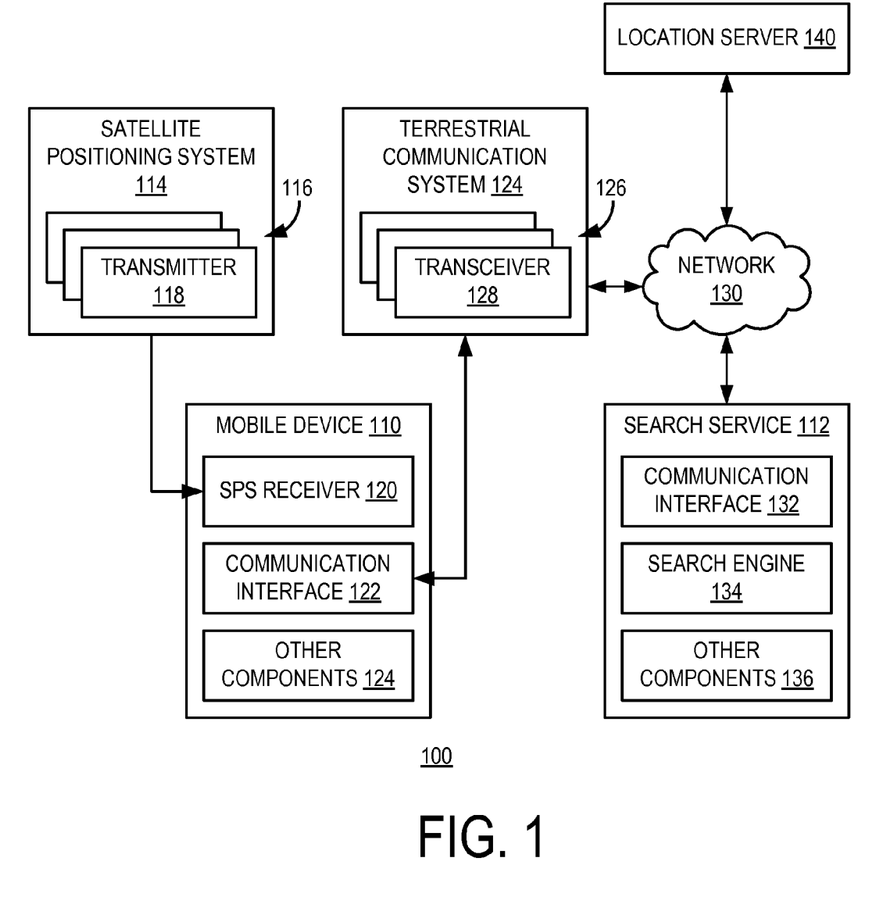
FIG. 1 is a schematic block diagram of an example network environment according to one implementation.

FIG. 1 is a schematic block diagram of an example network environment 100 according to one implementation. In network environment 100, a mobile device 110 may be operated by a human operator (e.g., a user) to initiate a search query at the mobile device. In at least some implementations, search queries that are initiated at mobile device 110 (e.g., via a user interface) may be processed, at least in part, by mobile device 110 and/or a search service 112 responsive to search terms of the search query.

Network environment 100 may include a navigation system such as a satellite positioning system (SPS) 114 comprising a plurality of satellite based transmitters 116, including example transmitter 118. SPS signals transmitted by one or more of transmitters 116 may be received at SPS receiver 120 of mobile device 110. SPS signals received at mobile device 110 may be used to estimate a geographic location of the mobile device. However, other techniques capable of providing a location estimate or "position fix" may be used. One approach, called Advanced Forward Link Trilateration (AFLT) may utilize CDMA or Enhanced Observed Time Difference (EOTD) in GSM or Observed Time Difference of Arrival (OTDOA) in WCDMA, measures at mobile device 110 relative times of arrival of wireless signals transmitted from terrestrial wireless transmitters. Another approach may include associating a MAC address from a WLAN access point within service range of mobile device 110 with a known location of the WLAN access point. It should be understood, however, that these are merely examples of techniques that may be employed at a mobile device for determining a location and claimed subject matter is not limited in this respect.

Mobile device 110 may include a communication interface 122 for communicating wirelessly with terrestrial communication system 124 via a wireless network. For example, communication interface 122 may include one or more wireless transceivers that may communicate wirelessly with a plurality of terrestrial based wireless transceivers 126 of terrestrial communication system 124, including wireless transceiver 128. Terrestrial communication system 124 may comprise an access point (e.g., a cellular base station) in some implementations for directing wireless communications between mobile device 110 and network 130. Additionally, terrestrial communication system 124 may provide a terrestrial based navigation system via one or more of wireless transceivers 126 by applying known triangulation and/or proximity sensing methods. SPS 114 may be omitted in implementations where terrestrial based navigation systems are used. Mobile device 110 may further include other components 124 that will be described in greater detail with reference to FIG. 2.

Network 130 may comprise one or more wide area networks (e.g., the Internet), local area networks (e.g., an intranet), and personal area networks. It will be appreciated that network 130 may support any suitable communication protocol, including the TCP/IP Internet protocol suite. Further it will be appreciated that the communication protocol for communicating on network 130 may differ from that of the communication protocol used by mobile device 110 to communicate wirelessly with terrestrial communication system 124. Search service 112 may include a communication interface 132 for communicating with network 130, a search engine 134 for processing search queries, at least in part, to obtain search results, and other components 136 which will be described in greater detail with reference to FIG. 2. In some implementations, search service 112 may be omitted, such as where a search engine for processing search queries resides at the mobile device as depicted, for example, in FIG. 2.

In some implementations, network environment 100 may further include a location server 140. Location server 140 may provide an indication of a geographic location of mobile device 110 to search service 112, which may be used to identify relevant search results for mobile device 110. In some implementations, location server 140 may be operated by a different entity than search service 112.

Figure 2:
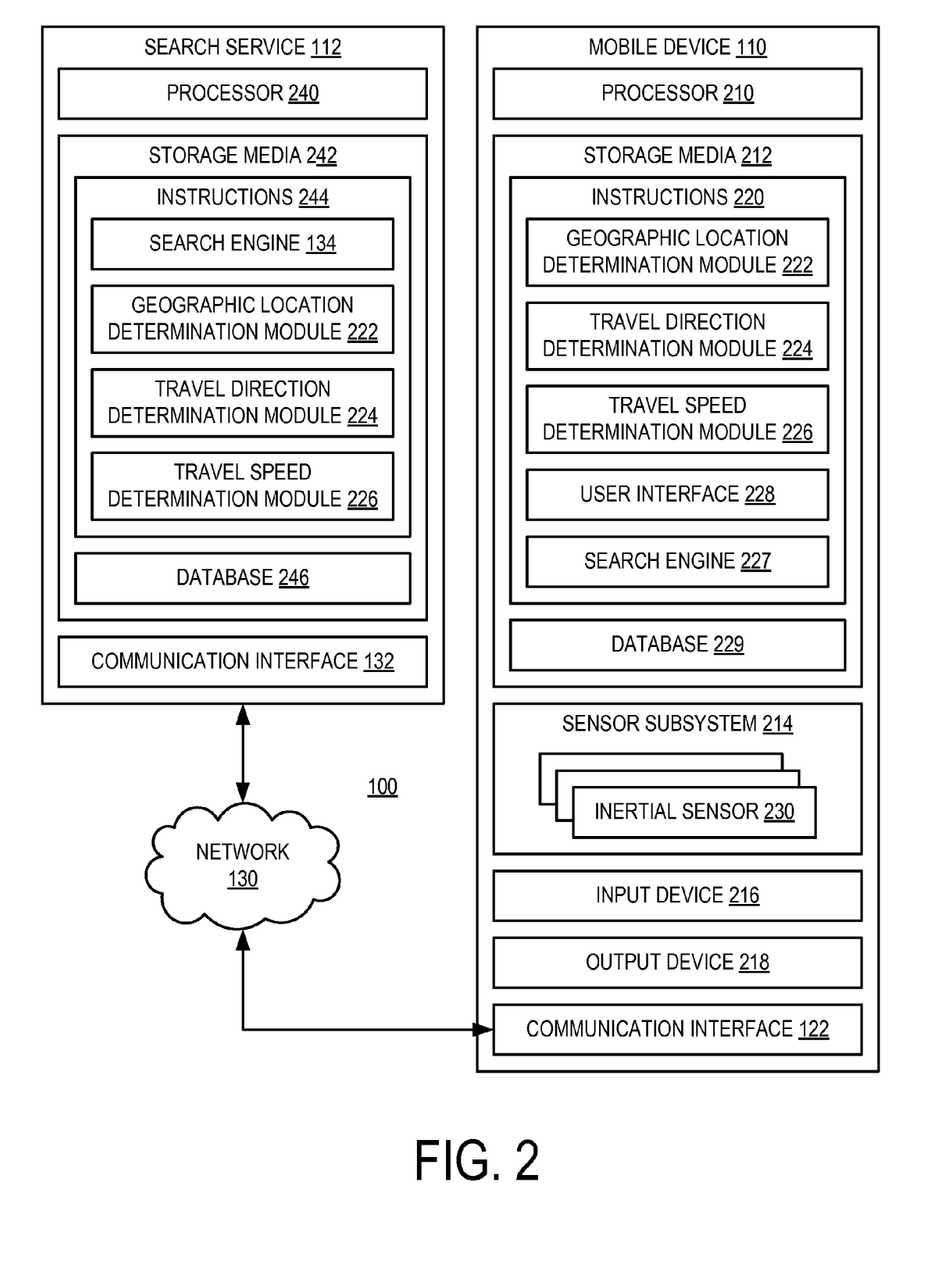
FIG. 2 is a schematic block diagram illustrating aspects of a search service and a mobile device according to one particular implementation.

FIG. 2 is a schematic block diagram illustrating aspects of a search service and a mobile device according to one particular implementation. In FIG. 2, satellite positioning system 114, terrestrial communication system 124, and location server 140 of FIG. 1 have been omitted for clarity. As such, mobile device 110 and search service 112 are depicted in FIG. 2 communicating via network 130 through their respective communication interfaces 122 and 132.

Mobile device 110 may comprise a mobile computing platform such as a mobile telephone, digital media player, personal digital assistant, portable navigation device (e.g., GPS navigation device), a laptop or notebook computer, or mobile workstation, just to name a few examples. Accordingly, other components 124 of mobile device 110 may include one or more processors such as processor 210 to execute instructions, storage media 212 for holding instructions 220 executable by one or more processors including processor 210, sensor subsystem 214 for identifying a state (e.g., an inertial state) of the mobile device, input device 216 for receiving user inputs (e.g., from a mobile device user), and an output device 218 for presenting information (e.g., to a mobile device user). In some implementations, storage media 212 may further have search engine 227 and a database 229 stored thereon to enable processing of search queries to be performed locally at mobile device 110 without necessarily requiring communication with search service 112. Database 229 may comprise geographic points of interest including one or more search results that may be obtained from the database by search engine 227 responsive to a search query initiated at the mobile device.

In some implementations, instructions 220 may include one or more programs, software modules, and/or databases. For example, instructions 220 may include one or more of a geographic location determination module 222 to determine or estimate a geographic location of mobile device 110, a travel direction determination module 224 to determine or estimate a travel direction and/or a predetermined route of travel of mobile device 110, a travel speed determination module 226 to determine or estimate a travel speed of mobile device 110, search engine 227, and a user interface 228 to facilitate user interaction with mobile device 110. In other examples, one or more of modules 222, 224, and 228 may alternatively reside at search service 112 depending on implementation as will be described in greater detail below.

Sensor subsystem 214 may include one or more inertial sensors such as inertial sensor 230 for obtaining inertial sensor measurements at the mobile device. As a non-limiting example, inertial sensor 230 may comprise an accelerometer, gyroscope, compass, strain gauge, or other suitable inertial measurement device for detecting and/or measuring acceleration of the mobile device. A plurality of inertial sensors of sensor subsystem 214 may be implemented as a multi-axis accelerometer in some examples to obtain acceleration measurements along a plurality of different coordinate axes. It will be appreciated in light of the present disclosure that inertial measurements obtained at the mobile device from one or more inertial sensors may used to determine or estimate a geographic location and/or a velocity of the mobile device (e.g., by integration), including a travel speed component and a travel direction component. Travel speed and travel direction may be estimated from inertial measurements by travel speed determination module 226 and travel direction determination module 224, respectively.

Output device 218 may comprise one or more of a graphical display, an audio loudspeaker, a haptic feedback device, etc., just to name a few examples. As a non-limiting example, user interface 228 may be presented via a graphical display of output device 218. Input device 216 may comprise one or more of a keyboard, a microphone, a touch-sensitive graphical display, a pointing device such as a mouse, joystick, controller, etc., just to name a few examples.

Search service 112 may comprise one or more computing platforms such one or more network servers, server systems, or workstations, among other suitable computing platforms. Accordingly, other components 136 of search service 112 depicted in FIG. 1 may include one or more processors such as processor 240, and storage media 242. Storage media 242 may have instructions 244 stored thereon that are executable by one or more processors including processor 240 to perform one or more of the operations described herein with respect to the flow diagrams of FIGS. 3 and 4. As a non-limiting example, instructions 244 may include one or more of search engine 134 as well as one or more of previously described geographic location determination module 222, travel direction determination module 224, and travel speed determination module 226. However, in other implementations, one or more of modules 222, 224, and 226 may alternatively reside at mobile device 110 as previously described. As yet another example, geographic location determination module 222 may reside at a location server as previously described in FIG. 1 with reference to location server 140.

Storage media 242 may further have a database 246 stored thereon. Search engine 134 may reference database 246 while processing search queries to determine relevant search results responsive to the search terms of the search query. As a non-limiting example, database 246 may comprise a plurality of index items such as geographic points of interest that search engine 134 may retrieve and identify as search results. In implementations where at least some search results are obtained from a database residing at mobile device 110 (e.g., database 229), a search engine (e.g., search engine 227) may alternatively or additionally reside at mobile device 110 as instructions held in storage media 212. In such implementations, search engine 227 residing at mobile device 110 may obtain one or more search results from database 229 responsive to search terms of a search query initiated at the mobile device.

Figure 3:
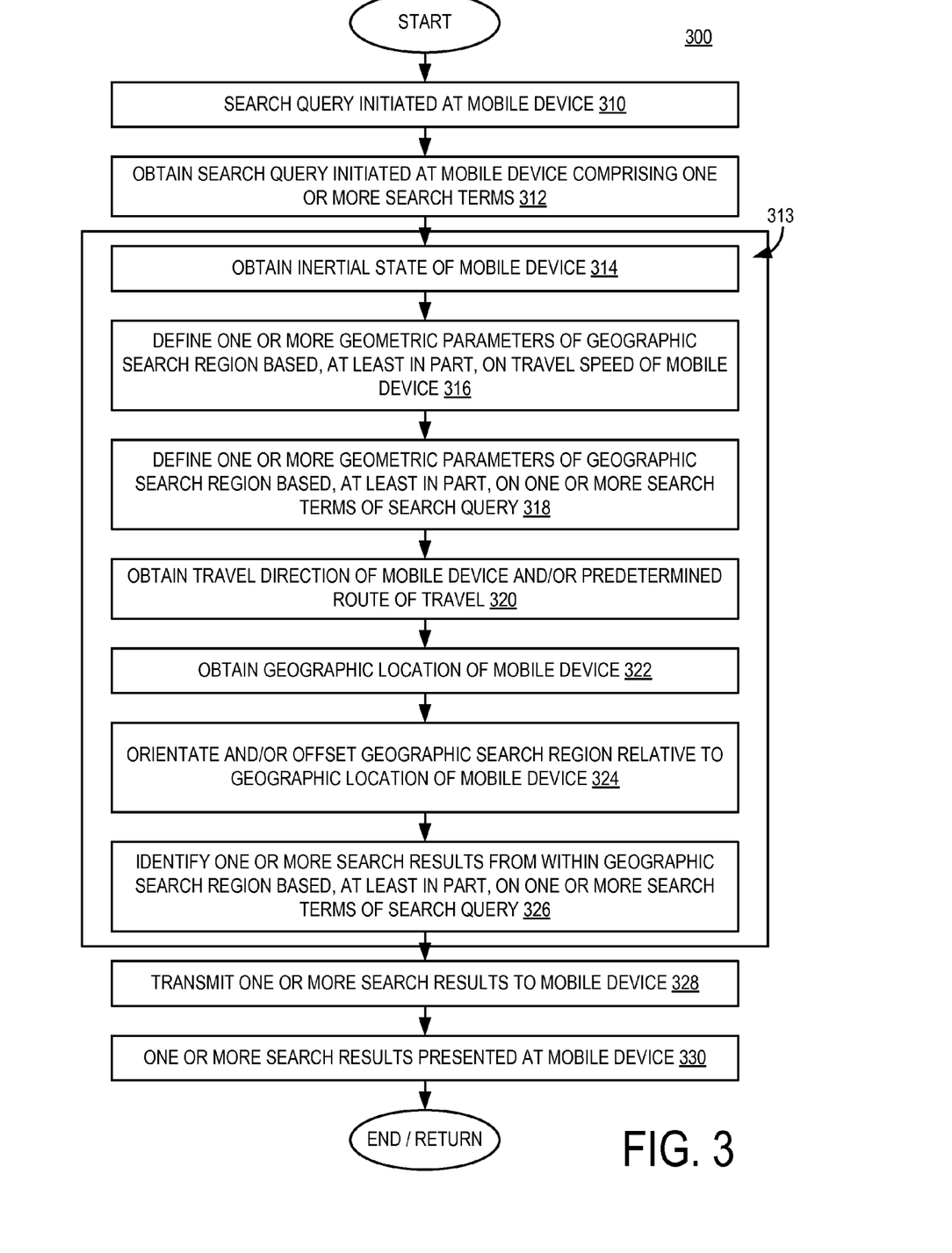
FIG. 3 is a flow diagram illustrating an example process for processing a search query initiated at a mobile device according to one implementation.

FIG. 3 is a flow diagram illustrating an example process 300 for processing a search query initiated at a client mobile device (e.g., mobile device 110) according to one implementation. It will be appreciated that the operations depicted by flow diagram 300 may be controlled and/or directed by execution of instructions stored on a storage medium by a processor to result in one or more of the described operations. It will further be appreciated that the various processes, methods, and operations described herein may be performed by one or more computing platforms depending on the implementation. As one example, process 300 may be performed by search service 112 of network environment 100 except where indicated at operations 310 and 330. As another example, process 300 may be performed by mobile device 110 without requiring communication with other network clients such as search service 112. Hence, one or more computing platforms such as mobile device 110 and/or search service 112 may comprise means for performing one or more of the various operations described with reference to process 300.

A search query may be initiated at a mobile device at operation 310. The search query initiated at operation 310 may comprise one or more search terms (e.g., from alphanumeric character strings). For example, in the context of mobile device 110 of network environment 100, a mobile device user may submit a search query via input device 216. As a non-limiting example, a mobile device user may initiate a search query to locate nearby geographic points of interest such as restaurants, gas stations, hotels, etc. The search query may be executable by a search engine (e.g., of search service 112) to obtain one or more search results responsive to the one or more search terms, and transmit the one or more search results to the mobile computing device.

Operation 312 may be performed to obtain a search query initiated at a mobile device. As one example, in the context of network environment 100, mobile device 110 may transmit one or more electrical signals representative of the search query via communication interface 122. Search service 112 may receive the one or more electrical signals representative of the search query at communication interface 132 via a wireless network provided by terrestrial communication system 124 and network 130. Such search queries may not be transmitted by a mobile device to other network clients such as search service 112 for implementations where search queries are processed at the mobile device, such as by search engine 227.

At 313, the search query may be processed to obtain one or more search results responsive to the one or more search terms by limiting a geographic scope of the one or more search results based, at least in part, on a state (e.g., an inertial state) of the mobile device. The geographic scope to which search results are limited may be defined, at least in part, by a size, a shape, an orientation, and an offset of a geographic search region from which the search results may be obtained as will be described in greater detail with reference to operations 314-326. As previously described, search queries may processed by one or more of the mobile device and/or search service depending on implementation.

Operation 314 may be performed to obtain an inertial state of the mobile device. The inertial state of a mobile device may be estimated based on one or more satellite positioning system signals and/or one or more inertial sensor measurements obtained from inertial sensors on-board a mobile device.

As one example, in the context of network environment 100, where travel speed determination module 226 resides at mobile device 110, travel speed may be estimated on-board the mobile device based, at least in part, on one or more satellite positioning system signals obtained from satellite positioning system 114 and/or one or more inertial sensor measurements obtained from the inertial sensors of sensor subsystem 214. The estimated travel speed may be utilized at the mobile device to process search queries or may be transmitted by mobile device 110 to search service 112 where it may be used by the search service to process search queries initiated at the mobile device.

As another example, where travel speed determination module 226 resides at search service 112, travel speed may be estimated by module 226 at search service 112 based, at least in part, on one or more satellite positioning system signals obtained from satellite positioning system 114 and/or one or more inertial sensor measurements obtained at mobile device 110 and transmitted to the search service. Such estimated travel speed may not be transmitted to search service 112 for implementations where search queries are processed at mobile device 110 without communicating with search service 112.

As yet another example, where a travel speed determination module resides at a remote computing resource such as location server 140, location server 140 may estimate travel speed based, at least in part, on one or more satellite positioning signals and/or inertial sensor measurements obtained from mobile device 110. The location server may then transmit an indication of travel speed of the mobile device to search service 112 where it may be used to process search requests.

It will be appreciated that state information (e.g., inertial state information) of a mobile device including indications of travel speed, travel direction, and/or geographic location of the mobile device may be obtained using a variety of approaches. As one example, state information or a tag indicating a location where the state information may be retrieved by a search service may be appended to a search query. For example, a search request including one or more search terms of the search query and the inertial state indicated by one or more inertial sensor measurements may be transmitted from the mobile device to the search service. Such a location where state information may be retrieved may include a location server, web service, or other suitable network location in which case the tag may include a universal resource locator (URL), an Internet protocol (IP) address, or other suitable logical network address. As another example, the state information may be polled from the mobile device and/or location server by the search service (e.g., by search engine 134) according to a predetermined polling schedule. The mobile device and/or location server may be adapted to respond to such a request by the search service for state information by transmitting requested state information to the search service. As yet another example, the state information may be transmitted to the search service by the mobile device and/or location server responsive to a change of state information of the mobile device or according to a predetermined reporting schedule. It should be understood, however, that these are merely examples of how a search service may obtain an indication of state information of a mobile device and claimed subject matter is not limited in this respect.

Operation 316 may be performed to define and/or vary one or more geometric parameters of a geographic search region based, at least in part, on a state of a mobile device such as a travel speed, direction of travel, and/or location of the mobile device. The one or more geometric parameters may include a geometric shape of the geographic search region and/or a size of the geographic search region as will be described in greater detail with reference to the process flow of FIG. 4. Such shape and size parameters of the geographic search region at least partially define the geographic scope of search results that may be obtained responsive to a search query.

As a non-limiting example, a geographic search region of a larger size may be defined to limit the one or more search results to within a larger geographic search region (e.g., a larger geographic area) responsive to a mobile device traveling at a first travel speed. A geographic search region of a smaller size may be defined to limit the one or more search results to within a smaller geographic search region (e.g., a smaller geographic area) responsive to the mobile device traveling at a second travel speed that is different from the first travel speed. As another non-limiting example, a geographic search region having a first shape may be defined responsive to a first travel speed of a mobile device and a geographic search region having a second shape different from the first shape may be defined responsive to a second travel speed of the mobile device. Hence, operation 316 may be performed by a search service or by the mobile device depending on implementation to vary a geographic scope of one or more search results based on an inertial state of a mobile device. In this way, search results appropriate to the travel capability and/or mobility of the mobile device user (e.g., as indicated by travel speed of the mobile device) may be considered in limiting the geographic scope of search results.

In addition to or as an alternative to operation 316, operation 318 may be performed to define and/or vary one or more geometric parameters of the geographic search region based, at least in part, on the one or more search terms of the search query. In some implementations, the search engine may be adapted to categorize search terms into two or more search categories. For example, a particular search term may be representative of a particular category of geographic points of interest. As a non-limiting example, a mobile device user may search among a number of different search categories of geographic points of interest, including gas stations, restaurants, retail stores, hotels, transportations services, etc. by submitting a search query. The search engine may then categorize the one or more search terms into one or more of the various search categories. Hence, operation 318 may be performed by a search service or by the mobile device to vary a geographic scope of one or more search results based on one or more search categories indicated by the search terms.

As one example, operation 318 may be performed to define a geographic search region having a larger size and/or first shape responsive to one or more search terms representing a first search category and define a geographic search region having smaller size and/or second shape different from the first shape responsive to the one or more search terms representing a second search category. As a non-limiting example, search queries for gas stations may encompass a broader geographic search region than search queries for restaurants, for example.

It will be appreciated that any number and/or type of search categories may be used for categorizing search terms beyond the previously described examples. For example, search terms may be categorized based on price of products (e.g., price of fuel) sold at corresponding geographic points of interest (e.g., fueling station) as indicated by the search query. As another example, search terms may be categorized based on a predefined ranking, whereby more important (e.g., higher ranked) search terms may be utilized in association with a broader geographic search region than less important (e.g., lower ranked) search terms.

In at least some implementations, travel speed and search terms may influence different geometric parameters of the geographic search region in different ways. As one example, travel speed may have greater or less influence on defining the size and/or shape of the geographic search region than search terms. As another example, travel speed may have greater or less influence on size of the geographic search region than search terms, whereas search terms may have greater or less influence on geometric shape of the geographic search region than travel speed.

Operation 320 may be performed to obtain an indication of travel direction of the mobile device and/or a predetermined route of travel of the mobile device. In the context of network environment 100, the travel direction and/or the predetermined route of travel of mobile device 110 may be obtained by search service 112 in a variety of ways depending on where travel direction determination module 224 resides. For example, if travel direction determination module 224 resides at mobile device 110 then a travel direction or predetermined route of travel of the mobile device may be estimated at the mobile device (e.g., from one or more inertial sensor measurements, SPS signals, and/or user defined target destinations) where it may be received by search service 112 via network 130. Alternatively, if travel direction determination module 224 instead resides at search service 112 then the one or more inertial sensor measurements, SPS signals, and/or user defined target destinations may be received at search service 112 from mobile device 110 where the information may be used to estimate the travel direction and/or predetermined route of travel of the mobile device.

Operation 322 may be performed to obtain an indication of geographic location of the mobile device. In some implementations, the indication of geographic location may be obtained by receiving the indication of geographic location from a location server independent of the one or more inertial sensor measurements. For example, SPS or terrestrial based navigation systems may be used to acquire a geographic location of the mobile device. In the context of network environment 100, the geographic location of mobile device 110 may be obtained by search service 112 in a variety of ways depending on where geographic location determination module 222 resides. For example, if geographic location determination module 222 resides at mobile device 110, then a geographic location of the mobile device may be estimated at the mobile device (e.g., from one or more inertial sensor measurements and/or SPS signals) where it may be received by search service 112 via network 130. Alternatively, if geographic location determination module 222 instead resides at search service 112 then one or more inertial sensor measurements and/or SPS signals may be received at search service 112 from mobile device 110 where it may be used to estimate geographic location of the mobile device. If geographic location determination module 222 instead resides at location server 140, then the indication of geographic location of the mobile device may be obtained from the location server by the search service. As previously described, state information including an indication of geographic location of the mobile device may be obtained by the search service in a variety of ways. For example, an indication of geographic location or a tag indicating a network location where the indication of geographic location may be retrieved by the search service may be appended to a search query initiated by the mobile device. As another example, the indication of geographic location may be polled from the mobile device and/or location server by the search service according to a predetermined polling schedule. As yet another example, the indication of geographic location may be transmitted to the search service by the mobile device and/or location server responsive to a change of in an estimated geographic location of the mobile device or according to a predetermined reporting schedule.

Operation 324 may be performed to orientate and/or offset the geographic search region (e.g., as defined at operation 216) relative to the geographic location of the mobile device based, at least in part, on a state of the mobile device. Such orientation and offset parameters of the geographic search region may further define the geographic scope of search results that may be obtained responsive to a search query.

In some examples, a geographic search region may be orientated relative to a geographic location of a mobile device by aligning an axis of symmetry of the geographic search region with a travel direction of the mobile device and/or by offsetting the geographic search region from the geographic location of the mobile device in a direction indicated by the travel direction of the mobile device. Hence, an orientation of a geographic search region may be varied relative to a geographic location of a mobile device responsive to a change of the travel direction of the mobile device. In this way, a search region may be projected primarily in front of the mobile device, in at least some examples, as indicated by the direction of travel.

Furthermore, in some examples, the magnitude of the offset may be varied responsive to a travel speed of the mobile device. As a non-limiting example, this offset may be increased as travel speed increases and may be decreased as travel speed decreases. Hence, operation 324 may be performed to vary an offset of a geographic search region relative to a geographic location of a mobile device responsive to the travel speed of the mobile device. Example search regions are described in greater detail with reference to FIGS. 5-10.

Operation 326 may be performed to identify one or more search results from within the geographic search region based, at least in part, on the one or more search terms. For example, in the context of network environment 100, search engine 134 may be adapted to identify the one or more search results by referencing geographic points of interest stored in database 246. Alternatively, where processing of the search query is performed at the mobile device without communicating with a search service, search engine 227 may be adapted to identify the one or more search results by referencing geographic points of interest stored in database 229. These geographic points of interest may be associated with geographic coordinates which may be compared to the geographic search region as defined at operation 316 for the orientation identified at operation 324. The search engine, in identifying the search results may demonstrate a preference for search results associated with geographic points of interest that are located within the geographic search region. As one example, the search engine may provide the search results as a hierarchical ranking of geographic points of interest, whereby the higher ranked geographic points of interest are located within the geographic search region and the lower ranked geographic points of interest are located external the geographic search region. As another example, the search engine may exclude geographic points of interest from the search results that are located external the geographic search region such that the search results include only those geographic points of interest that are located within the geographic search region.

Operation 328 may be performed to initiate transmission of the search results to the mobile device for implementations where the search query is processed, at least in part, by a search service. The mobile device may in turn receive the search results from the search service that are responsive to a search request initiated by the mobile device. For example, in the context of network environment 100, one or more electrical signals representative of the search results may be transmitted by search service 112 to mobile device 110 via network 130 and the wireless network provided by terrestrial communication system 124. It will be appreciated that instructions held in storage media of the search service may be executable by one or more processors of the search service to initiate the transmission of the search results to the mobile device. These one or more electrical signals may be interpreted by mobile device 110 to present the search results at operation 330 (e.g., via output device 218). As a non-limiting example, the one or more search results may be presented on a graphical display of the mobile device as a hierarchical ordered list. It will be appreciated that the one or more search results that are transmitted to the mobile device may be associated with a rank indicator that may be interpreted by the mobile device to present the search results in the appropriate order in the hierarchical ordered list. As another example, the one or more search results may be presented in conjunction with a graphical depiction of a map of the geographic region surrounding the geographic location of the mobile device as depicted in FIGS. 5-10, for example. Geographic points of interest associated with the search results may be presented on the map as icons at their respective geographic locations.

It will be appreciated that the search results may be periodically or continuously updated (e.g., in real-time) through application of process 300 as one or more of the geographic location, travel direction, predetermined route of travel, travel speed, and search terms change over time. As a non-limiting example, a process for obtaining updated search results will be described in greater detail with reference to FIG. 4.

Figure 4:
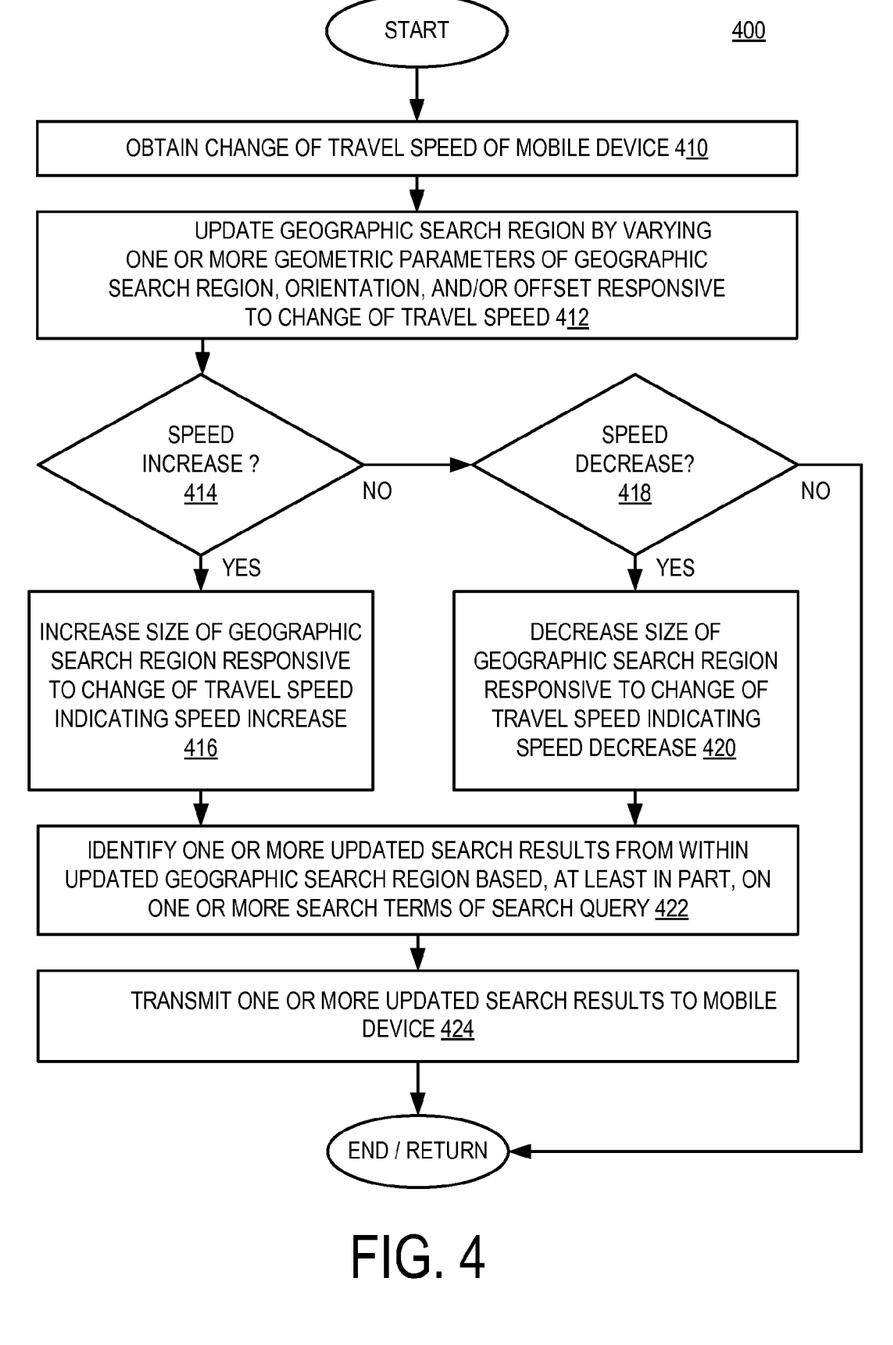
FIG. 4 is a flow diagram illustrating an example process for updating search results responsive to a change of the travel speed of the mobile device according to one implementation.

FIG. 4 is a flow diagram illustrating an example process 400 for updating search results responsive to a change of travel speed of a mobile device according to one implementation. Process 400 may be performed to increase the geographic scope of the search results if a change of the travel speed of the mobile device indicates a speed increase, and decrease the geographic scope of the search results if a change of the travel speed indicates a speed decrease. However, in other examples, the geographic scope of the search results may be reduced in response to a speed increase and increased in response to a speed decrease. It will be appreciated that the operations depicted by the flow diagram of FIG. 4 may be controlled and/or directed by execution of instructions stored on a storage medium by a processor to result in one or more of the described operations. In the context of network environment 100, process 400 may be controlled and/or directed, at least in part, by search engine 134 of search service 112. However, in other implementations, process 400 may be performed by a search engine residing at mobile device 110 (e.g., search engine 227) without communicating with a search service such as search service 112.

Operation 410 may be performed to obtain one or more electrical signals indicating a change of travel speed of a mobile device. As one example, in the context of network environment 100, travel speed determination module 226 may be adapted to receive SPS signals and/or inertial sensor measurements from inertial sensors of mobile device 110 and determine an updated travel speed responsive to an indication of a change of travel speed of the mobile device.

Operation 412 may be performed to update the geographic search region (e.g., as previously defined at operation 316) by varying one or more geometric parameters of the geographic search region responsive to a change of the travel speed. For example, if the change of the travel speed indicates a speed increase at operation 414 then operation 416 may be performed to increase the size of the geographic search region responsive to the speed increase. Hence, in at least some implementations, the size of the geographic search region may be increased as an increasing function of the travel speed of the mobile device, at least within some ranges. Alternatively, if the change of the travel speed indicates a speed decrease at operation 418 then operation 420 may be performed to decrease the size of the geographic search region responsive to the speed decrease. Hence, in at least some implementations, the size of the geographic search region may be decreased as the travel speed of the mobile device decreases, at least within some ranges.

Figure 9:
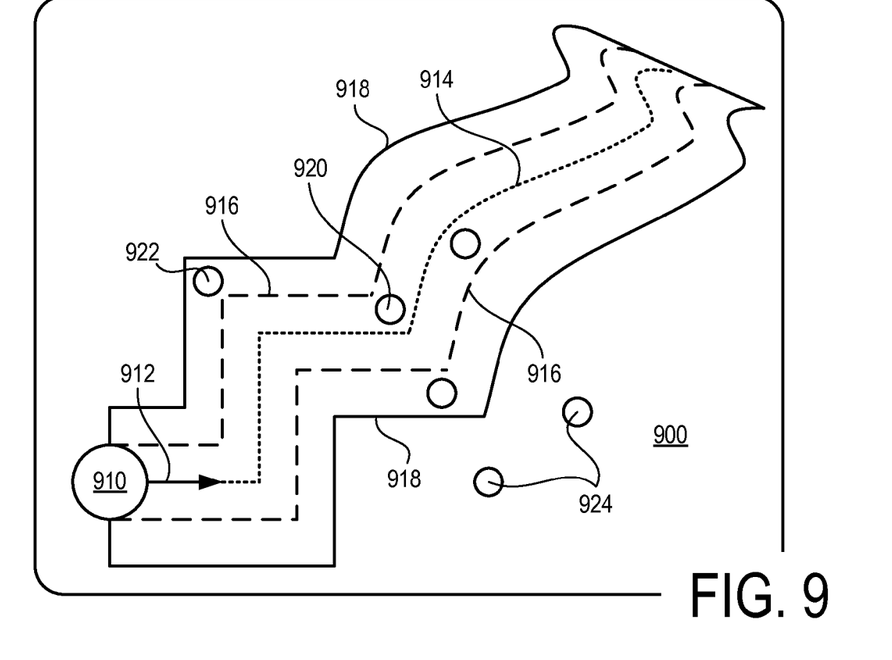
FIG. 9 is a schematic diagram of another example geographic environment according to another implementation.
Figure 10:
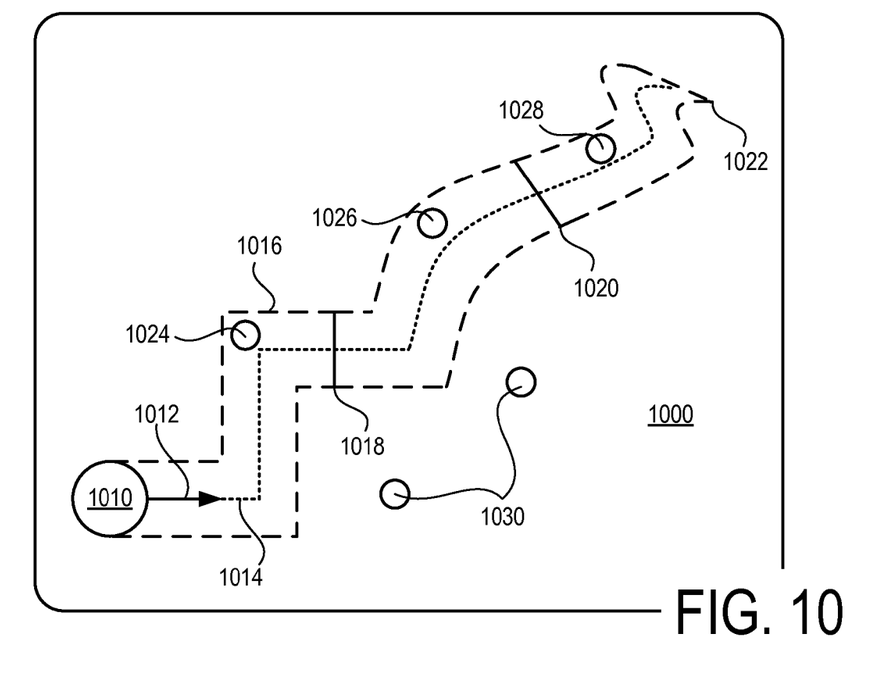
FIG. 10 is a schematic diagram of another example geographic environment according to another implementation.

Furthermore, in at least some implementations, a size of the geographic search region may be varied by increasing or decreasing one or more length dimensions of the geographic search region to increase or decrease an area of the geographic search region. Alternatively or additionally, the shape of the geographic search region may be varied responsive to an increase or decrease of the travel speed of the mobile device. As a non-limiting example, the shape of the geographic search region may be changed from a circle to an oval or from a square to a rectangle responsive to an indication of a speed increase or a speed decrease. However, it will be appreciated that any suitable shape may be used for the geographic search region. For example, FIGS. 9 and 10 depict how a geographic search region may follow a contour of a predetermined route of travel of a mobile device.

Operation 422 may be performed to identify one or more updated search results from within the updated geographic search region based, at least in part, on the one or more search terms of the search query. For example, if the size of the geographic search region has been increased at operation 416, then the search engine may select one or more updated search results from within the larger updated geographic search region. Alternatively, if the size of the geographic search region has been decreased at 416, then the search engine may select one or more updated search results from within the smaller updated geographic search region. In this way, the updated search results may demonstrate a preference for geographic points of interest that are within the updated geographic search region.

Operation 424 may be performed to transmit one or more electrical signals representing the one or more updated search results to the mobile device. The updated search results may be presented to a mobile device user at mobile device 110 via output device 218. For example, user interface 228 may be updated to reflect the updated search results. In this way, the mobile device user may be provided with updated search results (e.g., periodically or in real-time) as a travel speed of the mobile device changes.

It will be appreciated that while FIG. 4 is described in the context of a change in travel speed, such change of travel speed may be evaluated with respect to one or more travel speed thresholds that define one or more travel speed ranges. For example, a search service may utilize two, three, four, or any suitable number of travel speed ranges each having a corresponding set of geographic search region parameters. Accordingly, a change in travel speed of a mobile device from one travel speed range to another travel speed range may trigger the search service to update the geographic search region applied to the search query.

Figure 5:
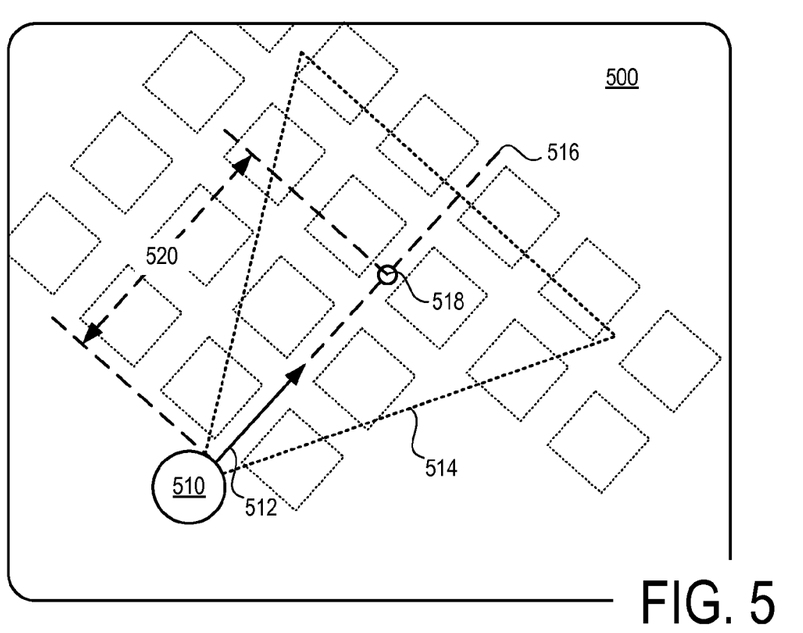
FIG. 5 is a schematic diagram of an example geographic environment depicting how a geographic search region may be orientated relative to a geographic location and/or travel direction of a mobile device according to one implementation.

FIG. 5 is a schematic diagram of an example geographic environment 500 depicting how a geographic search region 514 may be orientated relative to a geographic location and/or travel direction of a mobile device 510 according to one implementation. For example, FIG. 5 depicts mobile device 510 traveling through an example street environment along travel direction 512. As previously described with reference to operation 324 of FIG. 3, the geographic search region may be orientated relative to the geographic location of the mobile device by aligning an axis of symmetry 516 of the geographic search region with the travel direction 512 of the mobile device. Additionally or alternatively, a centroid 518 of the geographic search region may be offset from the geographic location in a direction indicated by the travel direction 512 of the mobile device as depicted in FIG. 5 by reference numeral 520. Such orientation and offset of the geographic search region relative to a geographic location of a mobile device may be varied responsive to travel speed of the mobile device and/or search terms of a search query initiated at the mobile device as previously described with reference to FIG. 3. As one example, offset 520 may be increased or decreased responsive to an increase or decrease in travel speed of the mobile device. As another example, offset 520 may be set to a first value responsive to a search query for restaurants whereas offset 520 may be set to a second value different from the first value responsive to a search query for hotels.

Figure 6:
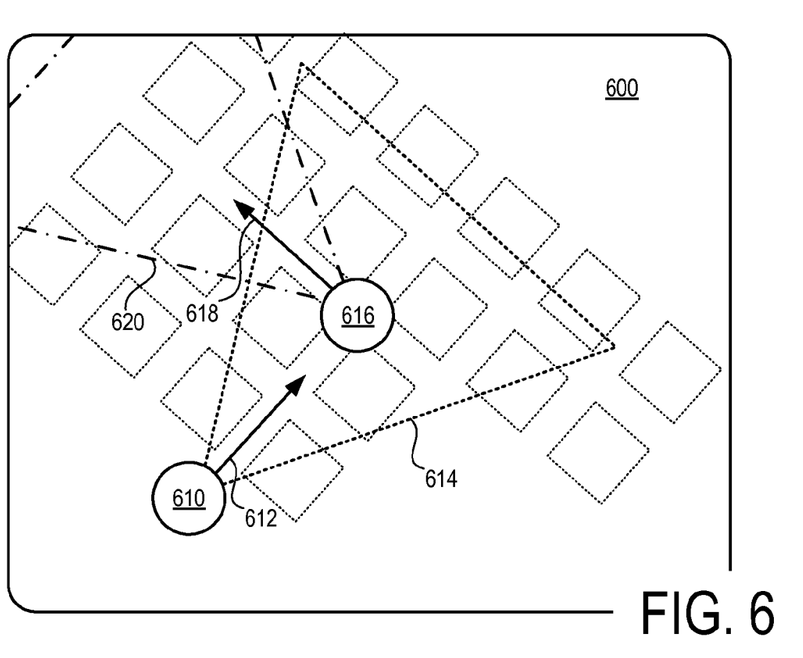
FIG. 6 is a schematic diagram of an example geographic environment depicting how a geographic search region may be orientated relative to a geographic travel direction of a mobile device according to one implementation.

FIG. 6 is a schematic diagram of an example geographic environment 600 depicting how a geographic search region may be orientated relative to a geographic travel direction of a mobile device according to one implementation. In FIG. 6, a first instance of a mobile device is indicated at 610 traveling in a travel direction indicated at 612, whereby a geographic search region 614 is provided. A second instance of a mobile device provided at a later time is indicated at 616 travelling in a different travel direction 618, whereby an updated geographic search region 620 is provided.

Figure 7:
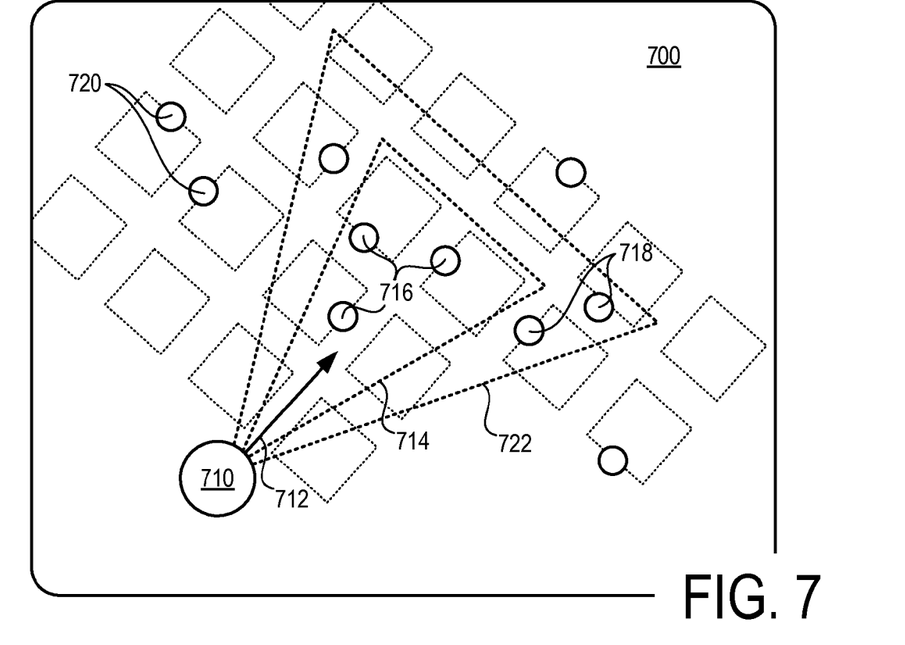
FIG. 7 is a schematic diagram of an example geographic environment depicting how a geographic search region may be updated responsive to a change of travel speed of a mobile device and/or a change of search terms according to one implementation.

FIG. 7 is a schematic diagram of an example geographic environment 700 depicting how a geographic search region may be updated responsive to a change of travel speed of a mobile device and/or responsive to a change of one or more search terms of a search query according to one implementation. Mobile device 710 is shown traveling along travel direction 712 whereby a first geographic search region 714 is provided responsive to mobile device 710 traveling at a first travel speed or for a first set of search terms. FIG. 7 further depicts a second geographic search region 722 provided responsive to mobile device 710 travelling at a second travel speed different from the first travel speed or for a second set of search terms different from the first set of search terms. For geographic search region 714, geographic points of interest 716 may be identified as the search results to be transmitted to the mobile device by the search service, because geographic points of interest 716 are within geographic search region 714. By contrast, geographic points of interest 718 and 720 may be excluded from the search results or may be subordinated to geographic points of interest 716 in a hierarchical order when mobile device 710 is travelling at the first travel speed or where the search terms are associated with a first search category. For geographic search region 722, geographic points of interest 716 and 718 may be identified as search results to be transmitted to a mobile device by a search service, because geographic points of interest 716 and 718 are within geographic search region 722. By contrast, geographic points of interest 720 may be excluded from search results or may be subordinated to geographic points of interest 716 and 718 in a hierarchical order if mobile device 710 is travelling at the second travel speed or where the search terms are associated with a second search category.

Figure 8:
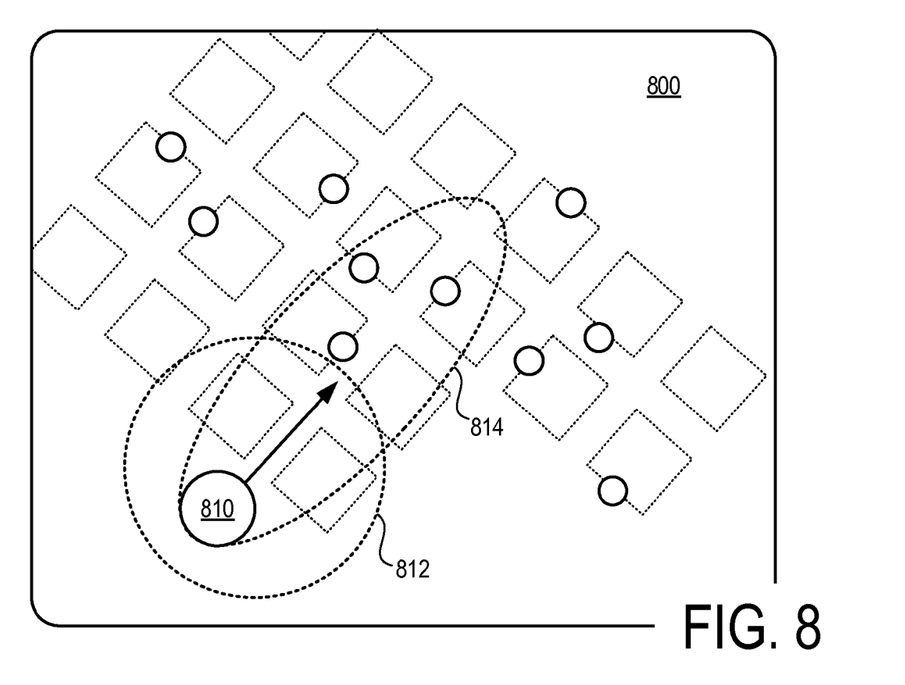
FIG. 8 is a schematic diagram of another example geographic environment according to another implementation.

FIG. 8 is a schematic diagram of a geographic environment 800 depicting how a geographic search region may be updated responsive to a change of travel speed of a mobile device 810 and/or a change of search terms according to another implementation. In FIG. 8, geographic search region 812 has a circular shape and geographic search region 814 has an ovular shape. Thus, FIG. 8 depicts how a shape of the geographic search region may be varied, for example, in response to one or more of a change to the travel speed of the mobile device and/or a change to the search terms comprising the search query. FIG. 8 also depicts how an offset of a geographic search region may be varied relative to a geographic location of the mobile device. For example, geographic search region 814 is depicted with a greater offset (e.g., relative to a centroid of the geographic search region) as compared to geographic search region 812. For example, the greater offset applied to geographic search region 814 may be responsive to the mobile device traveling at a higher travel speed, whereas the lesser offset applied to geographic search region 812 may be responsive to the mobile device traveling at a lower travel speed.

FIGS. 7 and 8 further depict how a geographic search region may have a variety of different shapes. It will be appreciated that the shape of a geographic search region is not limited to regular geometric shapes, but instead a geographic search region may have an irregular shape. Furthermore, in some implementations, the shape of the geographic search region may be contoured to physical characteristics of the geographic environment, such as streets, buildings, bodies of water, land formations, etc.

FIG. 9 is a schematic diagram of another example geographic environment 900 depicting how a geographic search region may be updated responsive to a change of travel speed of a mobile device and/or a change of search terms according to another implementation. In FIG. 9, mobile device 910 is travelling along a route of travel 914 as indicated by velocity vector 912. As one example, route of travel 914 may be a predetermined route of travel based, at least in part, on a user defined target destination. A first geographic search region 916 follows the contours of route of travel 914 by projecting outward from route of travel 914 by a first width (e.g., lateral distance from the route of travel). A second geographic search region 918 also follows the contours of route of travel 914, but projects outward from route of travel 914 by a second width (e.g., later distance from the route of travel) that is greater than the first width of first geographic search region 916.

Hence, as shown in FIG. 9, the second geographic search region is wider or broader than the first geographic search region relative to route of travel 914. Geographic point of interest 920 within the first geographic search region may be included in search results returned in response to a search query, whereas geographic points of interest 922 and 924 that are located outside of the first geographic search region may be excluded from the search results. By contrast, each of geographic points of interest 920 and 922 are within the second geographic search region and may be included in search results returned in response to a search query, whereas geographic points of interest 924 may be excluded from the search results.

As previously described, search results may be limited to different geographic search regions based on travel speed of the mobile device and/or search terms of a search query initiated by the mobile device. For example, a width or breadth of a geographic search region relative to a route of travel of a mobile device may be increased or decreased responsive to travel speed of the mobile device and/or search terms of a search query initiated at the mobile device. Hence, for example, search results may be limited to geographic search region 916 responsive to a first travel speed of a mobile device, whereas search results may be limited to geographic search region 918 responsive to a second travel speed of the mobile device that is greater or lesser in magnitude than the first travel speed. As another example, search results may be limited to geographic search region 916 responsive to a search query for restaurants, whereas search results may be limited to geographic search region 918 responsive to a search query for hotels.

FIG. 10 is a schematic diagram of another example geographic environment 1000 depicting how a geographic search region may be updated responsive to a change of travel speed of a mobile device and/or a change of search terms according to another implementation. In FIG. 10, mobile device 1010 is travelling along a route of travel 1014 as indicated by velocity vector 1012. For example, route of travel 1014 may be a predetermined route of travel. Geographic search region 1016 is depicted following the contours of route of travel 1014. In contrast to FIG. 9, FIG. 10 shows how a length dimension rather than a width dimension of a geographic search region may be varied responsive to travel speed of a mobile device and/or search terms of a search query initiated at the mobile device.

For example, a length of geographic search region 1016 along route of travel 1014 may be varied between lengths 1018, 1020, and 1022 to include or exclude different geographic points of interest from the search results that are returned to the mobile device. For example, geographic point of interest 1024 may be included in the search results if geographic search region 1016 is limited to length 1018, whereas geographic points of interest 1026, 1028, and 1030 may be excluded from the search results. As another example, geographic points of interest 1024, 1026, and 1028 may be included in the search results if geographic search region 1016 is limited to length 1022.

It will be appreciated in light of FIGS. 9 and 10 that in some examples, both width and length parameters of a geographic search region that follows a route of travel of a mobile device may be varied responsive to a state of the mobile device and/or search terms comprising a search query. As a non-limiting example, a length of the geographic search region along a predetermined route of travel may be increased and a width of the geographic search region extending outward from the predetermined route of travel may be reduced responsive to an increase of travel speed. In response to a decrease in travel speed, the length of the geographic search region along the predetermined route of travel may be reduced and the width of the geographic search region may be increased, for example.

The mobile devices described herein may be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

Techniques described herein may be used with an "SPS" that includes any one of several global navigation satellite systems (GNSS) and/or combinations of GNSS. Furthermore, such techniques may be used with positioning systems that utilize pseudolites or a combination of SVs and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with system time (e.g., an SPS time). Such a transmitter may be assigned a unique PN code so as to permit identification by a remote receiver. Pseudolites may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals" and/or "SV signals", as used herein, is intended to include SPS-like signals from pseudolites or equivalents of pseudolites.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof The herein described storage media may comprise primary, secondary, and/or tertiary storage media. Primary storage media may include memory such as random access memory and/or read-only memory, for example. Secondary storage media may include mass storage such as a magnetic or solid state hard drive. Tertiary storage media may include removable storage media such as a magnetic or optical disk, a magnetic tape, a solid state storage device, etc. In certain implementations, the storage media or portions thereof may be operatively receptive of, or otherwise configurable to couple to, other components of a computing platform, such as a processor. In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the above description, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features. In the preceding detailed description, numerous specific details have been set forth to provide a thorough understanding of claimed subject matter.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
    obtaining a search query initiated at a handheld mobile device, said search query comprising one or more search terms;
    obtaining an indication of geographic location of said handheld mobile device, and an inertial state of said handheld mobile device indicated by one or more inertial sensor measurements obtained at said handheld mobile device, wherein the inertial state comprises a speed and a travel direction;
    processing said search query to obtain one or more search results responsive to said one or more search terms, said one or more search results limited to a geographic scope that has a shape and an orientation based, at least in part, on the speed and the travel direction of said inertial state indicated by said one or more inertial sensor measurements;
    wherein the geographic scope of the one or more search results is limited to a search region in the travel direction of said inertial state of the handheld mobile device by:
        defining a geographic search region based on said inertial state of said handheld mobile device, and identifying said one or more search results from within said geographic search region responsive to said one or more search terms of said search query; and
        orientating said geographic search region relative to said geographic location by aligning an axis of symmetry of said geographic search region with said travel direction of said handheld mobile device, and offsetting said geographic search region from said geographic location in a direction indicated by said travel direction of said handheld mobile device, wherein an offset is a distance from a centroid of said geographic search region to said geographic location of said handheld mobile device; and
    continuously updating said geographic search region relative to changes in orientation of said handheld mobile device indicated by said one or more inertial sensor measurements.

2. The method of claim 1, wherein processing said search query comprises:
    obtaining said one or more search results limited to said geographic scope from a database residing at said handheld mobile device based, at least in part, on said inertial state indicated by said one or more inertial sensor measurements and responsive to said one or more search terms.

3. The method of claim 1, wherein processing said search query further comprises:
    limiting said geographic scope of said one or more search results based, at least in part, on said inertial state indicated by said one or more inertial sensor measurements.

4. The method of claim 3, wherein limiting said geographic scope of said one or more search results comprises:
    limiting said one or more search results to within a larger geographic search region if said travel speed indicated by said one or more inertial sensor measurements is a higher value; and
    limiting said one or more search results to within a smaller geographic search region if said travel speed indicated by said one or more inertial sensor measurements is a lower value.

5. The method of claim 3, wherein limiting said geographic scope of said one or more search results comprises: limiting said one or more search results to a first geographic search region having a first geometric shape if said travel speed indicated by said one or more inertial sensor measurements is a higher value; and
    limiting said one or more search results to a second geographic search region having a second geometric shape different from said first geometric shape if said travel speed indicated by said one or more inertial sensor measurements is a lower value.

6. The method of claim 3, further comprising:
    obtaining an indication of a predetermined route of travel of said handheld mobile device; and
    wherein limiting said geographic scope of said one or more search results comprises:
        limiting said one or more search results to a first geographic search region if said travel speed indicated by said one or more inertial sensor measurements is a higher value, said first geographic search region following at least a portion of said predetermined route of travel; and limiting said one or more search results to a second geographic search region if said travel speed indicated by said one or more inertial sensor measurements is a lower value, said second geographic search region following at least a portion of said predetermined route of travel, and said second geographic search region having a width and/or length relative to said predetermined route of travel that is different from said first geographic search region.

7. The method of claim 1, further comprising:
receiving an indication of a change of said inertial state of said handheld mobile device;
varying said geographic scope of said one or more search results responsive to said change of said inertial state of said handheld mobile device to obtain one or more updated search results.

8. The method of claim 7, wherein varying said geographic scope of said search results responsive to said change of said inertial state comprises:
increasing said geographic scope if said change of said inertial state indicates a speed increase of said handheld mobile device; and
decreasing said geographic scope if said change of said inertial state indicates a speed decrease of said handheld mobile device.

9. The method of claim 7, wherein varying said geographic scope of said search results responsive to said change of said inertial state comprises:
limiting said one or more search results to within a geographic search region; and
varying a shape of said geographic search region responsive to a change of travel speed of said handheld mobile device indicated by said change of said inertial state.

10. The method of claim 1, further comprising:
varying said geographic scope of said one or more search results based on said one or more search terms of said search query.

11. The method of claim 10, wherein varying said geographic scope of said one or more search results based on said one or more search terms of said search query further comprises:
categorizing said one or more search terms into one or more search categories; and
varying said geographic scope of said one or more search results based on said one or more search categories.

12. The method of claim 1, further comprising:
varying an orientation of said geographic search region relative to said geographic location responsive to a change of said travel direction of said handheld mobile device as indicated by said one or more inertial sensor measurements.

13. The method of claim 1, further comprising:
setting a first offset value of the geographic scope of the search region responsive to a first search query; and
setting a second offset value of the geographic scope of the search region responsive to a second search query, wherein the second offset value is different from the first offset value.

14. The method of claim 1, wherein the shape is a triangle.

15. The method of claim 1, wherein the shape is elliptical.

16. An article, comprising:
a non-transitory storage medium having stored thereon instructions executable by a computing platform to:
obtain an indication of geographic location of said handheld mobile device, and an inertial state of a handheld mobile device indicated by one or more inertial sensor measurements, wherein the inertial state comprises a speed and a travel direction;
process a search query initiated at said handheld mobile device to obtain one or more search results responsive to one or more search terms of said search query, said one or more search results limited to a geographic scope that has a shape and an orientation based, at least in part, on the speed and the travel direction of said inertial state indicated by said one or more inertial sensor measurements;
in order to limit the geographic scope of the one or more search results to a search region in the travel direction of said inertial state of the handheld mobile device:
define a geographic search region based on said inertial state of said handheld mobile device, and identify said one or more search results from within said geographic search region responsive to said one or more search terms of said search query;
orient said geographic search region relative to said geographic location through an alignment of an axis of symmetry of said geographic search region with said travel direction of said handheld mobile device, and an offset of said geographic search region from said geographic location in a direction indicated by said travel direction of said handheld mobile device, wherein said offset is a distance from a centroid of said geographic search region to said geographic location of said handheld mobile device; and
continuously update said geographic search region relative to changes in orientation of said handheld mobile device indicated by said one or more inertial sensor measurements.

17. The article of claim 16, wherein to process said search query, said instructions are further executable by said computing platform to:
obtain said one or more search results limited to said geographic scope from a database residing at said handheld mobile device based, at least in part, on said inertial state indicated by said one or more inertial sensor measurements and responsive to said one or more search terms.

18. The article of claim 16, wherein said instructions are further executable by said computing platform to:
receive an indication of a change of said travel speed of said handheld mobile device;
vary said geographic scope of said search results responsive to said change of said travel speed to obtain one or more updated search results.

19. The article of claim 16, wherein said instructions are further executable by said computing platform to vary a parameter of said geographic search region responsive to said inertial state indicated by said one or more inertial sensor measurements, wherein said parameter includes one or more of a shape of said geographic search region and/or a size of said geographic search region.

20. The article of claim 19, wherein said instructions are further executable by said computing platform to:
obtain an indication of a predetermined route of travel of said handheld mobile device; and
vary said parameter of said geographic search region relative to said predetermined route of travel.

21. An apparatus, comprising:
a communication interface;
a non-transitory storage medium: and one or more processors coupled to the communication interface and the non-transitory storage medium, and configured to:
- obtain, via said communication interface, an indication of geographic location of a handheld mobile device, and an inertial state of said handheld device indicated by one or more inertial sensor measurements obtained at said handheld device, wherein the inertial state comprises a speed and a travel direction;
- obtain, via said communication interface, a search query initiated at a handheld mobile device, said search query comprising one or more search terms via said input device;
- process said search query to obtain one or more search results responsive to said one or more search terms of said search query, said one or more search results limited to a geographic scope that has a shape and an orientation based, at least in part, on the speed and the travel direction of said inertial state indicated by said one or more inertial sensor measurements;
- in order to limit the geographic scope of the one or more search results to a search region in the travel direction of said inertial state of the handheld mobile device:
  - define a geographic search region based on said inertial state of said handheld mobile device, and identify said one or more search results from within said geographic search region responsive to said one or more search terms of said search query;
  - orient said geographic search region relative to said geographic location through an alignment of an axis of symmetry of said geographic search region with said travel direction of said handheld mobile device, and an offset of said geographic search region from said geographic location in a direction indicated by said travel direction of said handheld mobile device, wherein said offset is a distance from a centroid of said geographic search region to said geographic location of said handheld mobile device; and
  - continuously update said geographic search region relative to changes in orientation of said handheld mobile device indicated by said one or more inertial sensor measurements.

22. The apparatus of claim 21, wherein said one or more processors are further configured to: obtain said one or more search results limited to said geographic scope from a database based, at least in part, on said inertial state indicated by said one or more inertial sensor measurements and responsive to said one or more search terms.

23. The apparatus of claim 21, wherein said one or more processors are further configured to:
vary a parameter of said geographic search region responsive to said travel speed of said handheld mobile device, wherein said parameter includes one or more of a geometric shape of said geographic search region and a size of said geographic search region.

24. The apparatus of claim 23, wherein said one or more processors are further configured to: obtain, via said communication interface, an indication of a predetermined route of travel of said handheld mobile device; and vary said parameter of said geographic search region relative to said predetermined route of travel responsive to said travel speed.

25. An apparatus, comprising:
- means for obtaining a search query initiated at a handheld mobile device, said search query comprising one or more search terms;
- means for obtaining an indication of geographic location of said handheld mobile device, and an indication of an inertial state of said handheld mobile device from one or more inertial sensor measurements obtained at said handheld mobile device, wherein the inertial state comprises a speed and a travel direction;
- means for processing said search query to obtain one or more search results responsive to said one or more search terms, said one or more search results limited to a geographic scope that has a shape and an orientation based, at least in part, on said indication of the speed and the travel direction of said inertial state;
- wherein the geographic scope of the one or more search results is limited to a search region in the travel direction of said inertial state and in front of the handheld mobile device by:
  - means for defining a geographic search region based on said inertial state of said handheld mobile device, and identifying said one or more search results from within said geographic search region responsive to said one or more search terms of said search query; and
  - means for orientating said geographic search region relative to said geographic location by aligning an axis of symmetry of said geographic search region with said travel direction of said handheld mobile device, and offsetting said geographic search region from said geographic location in a direction indicated by said travel direction of said handheld mobile device, wherein an offset is a distance from a centroid of said geographic search region to said geographic location of said handheld mobile device; and
- means for continuously updating said search region relative to changes in orientation of said handheld mobile device indicated by said one or more inertial sensor measurements.

26. The apparatus of claim 25, comprising:
- means for limiting said geographic scope to a geographic search region based, at least in part, on said indication of said inertial state;
- wherein said inertial state of said handheld mobile device includes one or more of a travel speed and/or said travel direction of said handheld mobile device.

* * * * *